No. 885,184. PATENTED APR. 21, 1908.
W. SCHMIDT.
WINDING FOR DYNAMO ELECTRIC MACHINES.
APPLICATION FILED JULY 17, 1905.

WITNESSES:
Fred. H. Miller
R. J. Dearborn

INVENTOR
Walter Schmidt
BY
Wesley G. Carr
ATTORNEY

UNITED STATES PATENT OFFICE.

WALTER SCHMIDT, OF PITTSBURG, PENNSYLVANIA, ASSIGNOR TO WESTINGHOUSE ELECTRIC & MANUFACTURING COMPANY, A CORPORATION OF PENNSYLVANIA.

WINDING FOR DYNAMO-ELECTRIC MACHINES.

No. 885,184.   Specification of Letters Patent.   Patented April 21, 1908.

Application filed July 17, 1905. Serial No. 270,158.

*To all whom it may concern:*

Be it known that I, WALTER SCHMIDT, a citizen of the United States, and a resident of Pittsburg, in the county of Allegheny and State of Pennsylvania, have invented a new and useful Improvement in Windings for Dynamo-Electric Machines, of which the following is a specification.

My invention relates to windings for dynamo-electric machines, and has special reference to such windings as are adapted for embodiment in the rotatable members of induction regulators.

The object of my invention is to provide a form of winding which shall be of simple and rigid construction, which may be easily applied to the rotatable core of an induction regulator and which shall occupy a minimum amount of space outside of the core slots. To accomplish these objective results the winding of my invention has a novel arrangement of end connections which is specially applicable to the rotatable members of induction regulators having two poles.

Induction regulators are usually provided with relatively wide and thin coils which are wound into open slots in the surface of the core, and the coils from one group of slots, comprising approximately one-fourth of the whole number, are connected to a similar opposite group; then the remaining pair of opposite groups are connected, the end connections of the latter crossing over those of the former. All the coils of the first layer of end connections are perpendicular to the end of the core and follow curved parallel lines in crossing it to avoid interference with the core shaft. The outside layer of coils is divided into two portions; the coils which are nearer the shaft and in substantially diametrically opposite slots cross over the coils of the first group and are wound on edge while those that are further removed from the core shaft, are bent down, after leaving the slots, into a plane parallel with the end of the core and follow arcs which are substantially concentric with the circumference of the core. This construction and arrangement not only necessitates the use of a minimum amount of space but offers greater resistance to distortive forces and is relatively easy to complete.

My invention is illustrated in the accompanying drawings in which

Figure 1:
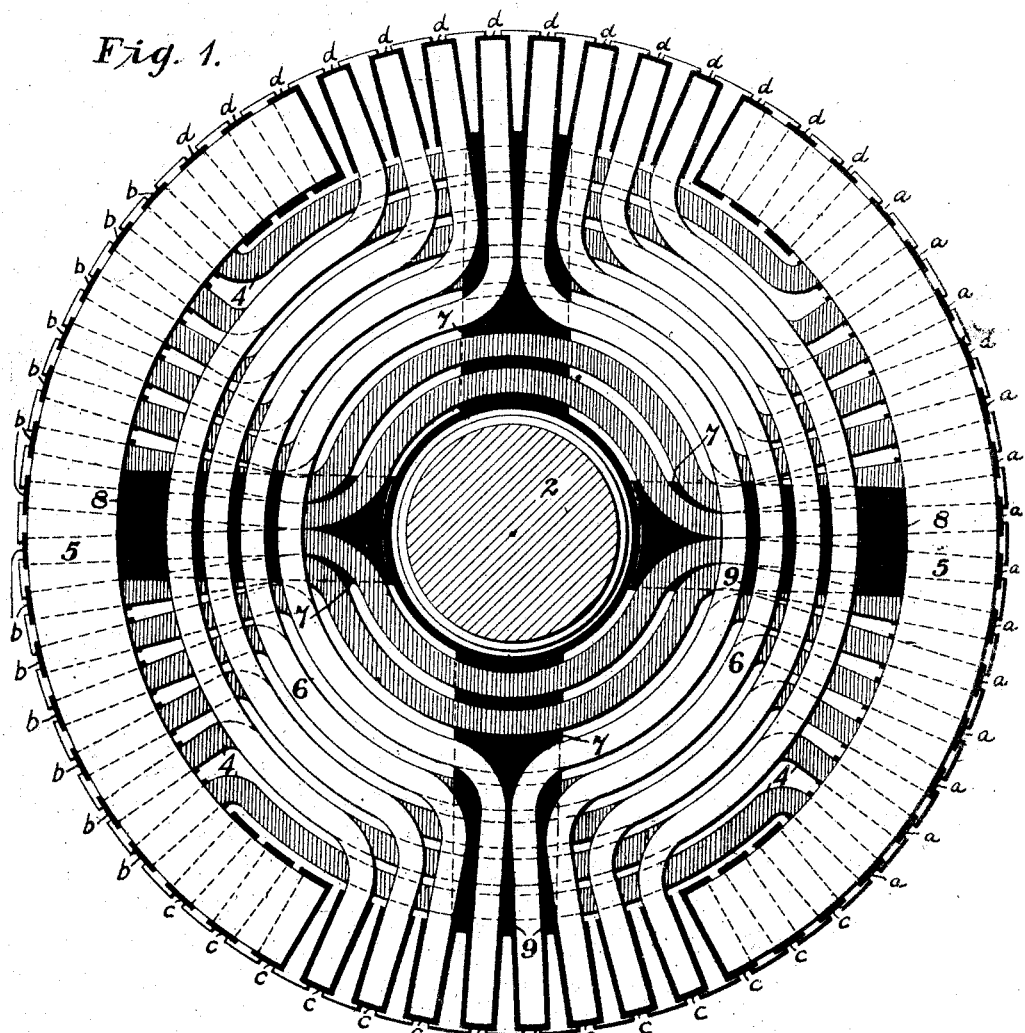
Figure 2:
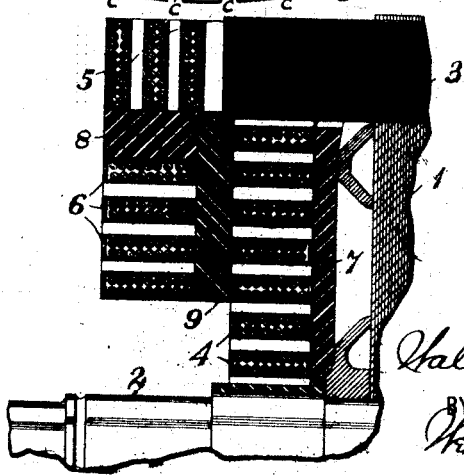

Figure 1 is an end view of a rotatable core wound in accordance therewith and Fig. 2 is a partial, longitudinal section of the core of Fig. 1.

Referring to the drawings, a cylindrical magnetizable core 1 is provided with a shaft 2 and with a plurality of radial slots in its surface which may be divided into two groups, two sets of opposite slots $a$ and $b$ forming one group and two intervening, opposite sets of slots $c$ and $d$ forming the other group. The magnetizing winding for the core 1 comprises a plurality of coils of rectangular cross-section that are partially contained in slots $a$ and $b$ which are on opposite sides of the core. Another similar winding, the center line of which is perpendicular to that of the first, is located in the slots $c$ and $d$.

Each coil of the first group comprises two straight portions 3 which are located in the core slots $a$ and $b$ and two similar end connections 4 that are formed by bending the coils as they leave the slots through angles of substantially 90° toward the center of the core and then in curves that may be merely slight deviations from straight lines or substantially arcs of circles concentric with the shaft, the said end connections being disposed in edgewise relation with reference to the ends of the core and adjacent thereto. The coils pertaining to the slots $c$ and $d$ have end connections consisting of two groups 5 and 6 the former of which are bent sidewise, adjacent to the ends of the slots, into planes substantially parallel to the ends of the core and into arcs of circles substantially concentric with the shaft.

The connections 6 have substantially the same form and arrangement as the connections 4 except that they occupy planes that are more remote from the ends of the core.

The end connections may be supported by spacing blocks of insulating material, a pair of similar blocks 7 being fitted between each end of the core and the groups 4, and two pair of similar blocks 8 and 9 being fitted to each of the groups 5 and 6.

Although I have shown and described a specific arrangement of coils, I desire it to be understood that all variations therefrom which do not materially affect the mode of operation or result are within the scope of my invention.

I claim as my invention:

1. The combination with a magnetizable core having a plurality of longitudinal slots, of a winding therefor comprising two groups of coils, one of which has flat end connectors disposed in edgewise relation substantially parallel to the ends of the core and the other of which has two sets of flat end connectors that are respectively disposed in sidewise and edgewise relation to the ends of the core.

2. The combination with a magnetizable core having a plurality of longitudinal slots, of a winding therefor comprising two groups of coils of oblong cross-section the ends of some of which are disposed edgewise and the ends of others of which are disposed sidewise in planes substantially parallel to the ends of the core.

3. The combination with a magnetizable core having a plurality of longitudinal slots, of a winding therefor comprising two approximately similar groups of coils at substantially right angles to each other, the end connectors of one group being disposed edgewise while the end connectors of one portion of the other group are disposed sidewise in planes parallel to the ends of said core and the end connectors of the other portion are disposed edgewise in planes outside of and parallel to those of the first group.

4. The combination with a magnetizable core having a plurality of longitudinal slots, of a winding therefor comprising two groups of coils at right angles to each other, the end connectors of which are disposed in two substantially parallel planes the end connectors in one group being disposed in edgewise relation and some of those in the other group being disposed in edgewise and some in sidewise relation to the core ends.

5. The combination with a magnetizable core having plurality of longitudinal slots, of two windings the coils of which are at right angles to each other and the end connectors of which, at each end of the core, are arranged in three sets located in two parallel planes, the connectors of one set being disposed sidewise and those of the other two sets being disposed edgewise with reference to the ends of the core.

6. The combination with a magnetizable core having a plurality of longitudinal slots, of a winding therefor comprising two approximately similar groups of coils at substantially right angles to each other, the end connectors of one group being disposed edgewise while the end connectors of one portion of the other group are disposed sidewise in planes parallel to the ends of said core and the end connectors of the other portion are disposed edgewise in planes outside of and parallel to the first group, and a plurality of interposed insulating blocks for supporting the different groups of end connectors.

7. The combination with a magnetizable core having a plurality of longitudinal slots, of a winding therefor comprising two groups of coils at right angles to each other the end connectors of which are disposed in two substantially parallel planes, and a plurality of insulating blocks for supporting the different groups of end connectors.

8. The combination with a cylindrical core having longitudinal slots, of a winding comprising two groups of coils, one of which has its end portions disposed in edgewise relation with reference to the core ends and the other of which has end portions disposed in edgewise relation and other end portions disposed in sidewise relation to the core ends.

In testimony whereof, I have hereunto subscribed my name this 12th day of July 1905.

WALTER SCHMIDT.

Witnesses:
Wm. H. Jacobi,
J. L. Chantemerle.